(12) United States Patent
Wei

(10) Patent No.: US 6,385,384 B1
(45) Date of Patent: May 7, 2002

(54) GLASSES CONTAINING RARE EARTH FLUORIDES

(75) Inventor: Huailiang Wei, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/268,768

(22) Filed: Mar. 15, 1999

(51) Int. Cl.[7] .................................................. G02B 6/00
(52) U.S. Cl. ............................ 385/141; 65/385; 501/37
(58) Field of Search .............................. 501/37, 3, 54; 385/141, 123, 147; 65/385

(56) References Cited

U.S. PATENT DOCUMENTS

| | | | |
|---|---|---|---|
| 4,263,031 A | 4/1981 | Schultz | 65/3 |
| 4,936,650 A | 6/1990 | Ainslie et al. | 350/96.34 |
| 5,262,365 A | * 11/1993 | Oyobe et al. | 501/54 |
| 5,710,786 A | * 1/1998 | Mackechine et al. | 372/6 |
| 5,905,838 A | * 5/1999 | Judy et al. | 385/123 |
| 5,955,388 A | * 9/1999 | Dejneka | 501/3 |

OTHER PUBLICATIONS

"New transparent vitroveramics codoped with Er3+ and Yb3+ for efficient frequency upconversation" by Yuhu Wang, Appl. Phys. Lett.63 (24), pp. 3268–3270, Dec. 1993.*

"Transparent glass ceramics for 1300 nm amplifier applications" by RTick et al., J. Appl. Phys.78(11), pp. 6367–6374, Dec. 1995.*

Yuhu Wang, "New transparent vitroceramics codoped with $Er^{3+}$ and $Yb^{3+}$ for efficient frequency upconversion", Appl. Phys. Lett. 63 (24) Dec. 13, 1993 pp.3268–3270.

P.A. Tick, N.F. Borrelli, L. K. Corneuius & M. A. Newhouse "Transparent glass ceramics for 1300 nm amplifier applications", J. Appl. Phys. 78 (11), Dec. 1, 1995 pp. 6367–6374.

* cited by examiner

Primary Examiner—Akm E. Ullah
(74) Attorney, Agent, or Firm—Angela N. Nwaneri; Vincent T. Kung

(57) ABSTRACT

A non-porous, transparent glass-ceramic body that is consolidated from a predominately silica-based preform ($SiO_2$+ $GeO_2$ 85–99.0 wt. %) containing rare earth fluoride crystals embedded within by solution chemistry. The glass ceramic body is suited for making fibers for optical amplifiers.

30 Claims, No Drawings

GLASSES CONTAINING RARE EARTH FLUORIDES

TECHNICAL FIELD

This invention relates to a new process for embedding rare earth fluorides into silica glasses. The new embedded glasses are useful as optical amplifiers for telecommunications.

BACKGROUND ART

All optical amplifiers, and particularly erbium doped fiber amplifiers have experienced explosive deployment in fiber optic telecommunication systems because of the well-recognized advantages that these types of devices have over repeater type amplification schemes. For example, the erbium doped fiber amplifier (EDFA) conveniently operates in the preferred 1550 nm third telecommunications spectral window, has high polarization-insensitive gain, low cross talk between signals at different wavelengths, good saturation output power, and a noise figure close to the fundamental quantum limit. The excellent noise characteristics potentially allow hundreds of amplifiers to be incorporated along the length of a fiber telecommunications link which could then span thousands of kilometers. Optical amplifiers, and particularly EDFAs in contrast to electronic repeaters, are also transparent to data rate, signal format and wavelength over a limited range, making them especially useful for wavelength multiplexed communication systems that simultaneously transmit a large number of signals using different wavelength bands for each signal.

Currently, germania-doped silica and heavy metal fluoride (such as ZBLAN) glasses are used as hosts for rare earth ions, such as Erbium and praseodymium, to make fiber amplifiers. Silica base glasses are chemically and mechanically stable. They easily are fabricated and fused into the germania-doped silica communication fibers. However, silica glasses are inefficient for infrared upconversion because of their large phonon energy. On the other hand, fluoride glasses have low phonon energy, but are very difficult to fiberize. They are also hard to fuse with the silica fibers.

Transparent oxyfluoride glass-ceramics which are comprised of fluoride microcrystals in the mainly oxide glass matrices offer unique properties of high chemical durability of oxide glasses and low phonon energy environment for the rare earth ions of fluoride glasses or crystals. These glass-ceramics are made by melting oxides and fluorides of the cation components to form oxyfluoride glasses. Heat treatment then precipitates out fluoride micro-crystals (ceramming). Because these transparent oxyfluoride glass-ceramics generally have lower melting temperatures, higher refractive indexes and higher thermal expansion coefficients than silica glasses, they may pose a challenge to making fiber amplifiers with pure silica overcladding.

Accordingly, there continues to be a need for CTE-matched optical amplifiers and methods for making such products. In particular, there is a need for new ways for embedding rare earth fluorides into glasses suitable for making optical amplifiers.

DISCLOSURE OF THE INVENTION

Briefly, the present invention relates to a silica-based glass containing rare earth fluoride crystals. In another aspect, the invention relates to a method for embedding rare earth fluorides into silica-based (or germania-doped silica) glasses by solution chemistry. By silica-based I mean glass having silica and/or germania-doped silica as the predominant component.

The rare earth fluoride doped silica preforms of this invention comprise:

| Component | Weight Percent |
|---|---|
| $SiO_2$ and $GeO_2$ | 85–99.0 |
| $Al_2O_3$ and $Ga_2O_3$ | 0–14.9 |
| $Re_xF_y$ | 0.01–2.0 |
| $R_xF_y$ | 0.1–2.0 | wherein X and Y are integers. The sums such as $SiO_2+GeO_2$ are fully interchangeable. Each component could range from 0–99% as long as the total $SiO_2+GeO_2$ is between 85 and 99%. The sums of $Al_2O_3$ and $Ga_2O_3$ also are interchangeable. R is alkali or alkaline-earth ions such as Na, K, Li, Ca and Mg.

BEST MODE OF CARRYING OUT INVENTION

As contemplated herein, embedding rare earth fluorides into a silica (or germania-doped silica) glasses comprises the following steps. The first step forms a porous silica core preform by OVD process. Preferably, the preform has a pore size of about 500 nm or less, more preferably, in the range of 200 to 500 nm. The second step submerges the preform into an aqueous solution of rare earth ions. Preferably the solution is a nitrate solution such as $Er(NO3)_3$, $Pr(NO3)_3$, $Nd(NO_3)_3$, $Dy(NO_3)_3$, or a combination of these nitrates. At this stage, the pores in the preform fill with the aqueous solution of rare earth ions. The third step removes the preform from the nitrate solution and washes out the extra amount of nitrate on the outside surfaces of the preform using deionized water. The fourth step submerges the preform into an aqueous solution of a fluorinating agent, such as ammonium bifluoride, ammonium fluoride, HF or KF. F ions diffuse into the pores and the following reaction occurs,

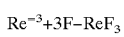

$Re^{-3}+3F-ReF_3$

Rare earth trifluorides precipitate out from the solution and deposit on the wall of pores.

The fifth step dries the preform at about 300 C. in a vacuum to remove the remaining water inside the pores. Generally, after the drying step the preform is still porous.

The sixth step heats the preform again in a chlorine or fluorine environment to remove any residual water and finally consolidates the preform into a non-porous glass body which may serve as a preforms for other useful articles and devices such as fibers for optical amplifiers.

The melting points of rare earth fluorides range from 1143 C($HoF_3$) to 1515 C. ($ScF_3$), which are lower than the melting point of silica (1710 C.) and close to the sintering temperature of germania-doped silica. Therefore, in the sixth step, normal consolidation procedure for OVD core preforms can be used to consolidate the fluoride-silica preforms.

In another embodiment, the fourth step may be carried out by flowing/diffusing fluorine or fluorine-containing gases such as HF into the pores of the preform.

The refractive indexes of the embedded fluorides can be adjusted by mixing the rare earth fluorides with alkali or alkaline earth fluorides, such as LiF ($n_D$=1.395), $CaF_2$ ($n_D$–1.434), SrF ($n_D$=1.442) and $MgF_2$, which have lower refractive indexes and low solubilities in water. The size of fluoride microcrystals can be adjusted by controlling the concentration of solutions and pore surface treatments.

Doping the glasses with a rare earth metal is desirable for enhancing the emission and absorption spectra, as discussed above. Therefore, the silica preforms of the present invention include a rare earth element, such as Y, La, Ce, Pr, Nd, Pm, Sm, Eu, Gd, Tb, Dy, Ho, Er, Tm, Yb or Lu. Preferably, the rare earth element is Er, Pr, Eu or Dy. Even more preferably, the rare earth element is Er (e.g., $ErF_3$). The glasses also may contain various other components. For example, the glasses may further include up to 5 wt. % of other oxides, such as $Y_2O_3$, $La_2O_3$, CdO, $B_2O_3$, SnO, $ZrO_2$, $P_2O_5$, $Sb_2O_5$, $As_2C_5$ or $Bi_2O_3$.

The rare-earth-fluoride-containing, silica-based glass of the invention is suitable for making and use in opto-electronic devices such as optical fibers or optical amplifiers, which offer the unique properties of transparent oxyfluoride glass-ceramics discussed above. In addition, the inventive silica-based optical amplifiers, when used with silica overcladding, provide the added benefit of matched CTE and refractive index between the fiber and the cladding.

In addition to these embodiments, persons skilled in the art can see that numerous modifications and changes may be made to the above invention without departing from the intended spirit and scope thereof.

I claim:

1. A non-porous glass body comprising rare earth fluoride microcrystals doped within, and having a composition on a weight percent basis consisting essentially of:

| | |
|---|---|
| $SiO_2$ | 0–99.0 |
| $GeO_2$ | 0–99.0 |
| $SiO_2 + GeO_2$ | 85–99.0 |
| $Al_2O_3 + Ga_2O_3$ | 0–14.9 |
| $RE_xF_y$ | 0.01–2.0 |
| $R_xF_y$ | 0.1–2.0 | wherein RE is a rare earth metal ion, R is an alkali or alkaline-earth ion, x and y are integers ≠0, further the glass contains 0 to 5 wt. % each, of at least one of the following oxides: $Y_2O_3$, $La_2O_3$, CdO, $B_2O_3$, SnO, $ZrO_2$, $P_2O_5$, $Sb_2O_5$, $As_2O_5$, or $Bi_2O_3$.

2. The non-porous glass body according to claim 1, wherein the glass body is consolidated from a porous preform.

3. The non-porous glass body according to claim 1, wherein said porous preform is made by oxide vapor deposition.

4. The non-porous glass body according to claim 1, wherein the porous preform has within it a multitude of pores, each pore having a size of about 500 nm or less.

5. The non-porous glass body according to claim 1, wherein the rare earth metal ions are selected from the group of Y, La, Ce, Pr, Nd, Pm, Sm, Eu, Gd, Tb, Dy, Ho, Er, Tm, Yb, or Lu.

6. The non-porous glass body according to claim 1, wherein the rare earth metal is any one of Er, Pr, Eu, or Dy.

7. A non-porous glass body according to claim 2, wherein the porous preform is doped with rare earth fluoride microcrystals by a process comprising: submerging the preform into an aqueous solution of rare earth ions; removing the preform from the aqueous solution; washing the preform; exposing the washed preform to a fluorinating agent, to thereby precipitate rare earth fluoride crystals in the pores of the preform; drying the preform; and consolidating the preform into a non-porous glass body.

8. The non-porous glass body according to claim 7, wherein the aqueous solution of rare earth ions is a nitrite solution consisting of $Er(NO_3)_3$, $Pr(NO_3)_3$, $Nd(NO_3)_3$, $Dy(NO_3)_3$, or a combination thereof.

9. The non-porous glass body according to claim 7, wherein the rare earth fluorides in the porous preform are rare earth trifluorides.

10. The non-porous glass body according to claim 7, wherein the deionized water is employed to wash the porous preform.

11. The non-porous glass body according to claim 7, wherein the porous preform is dried at about 300° C. in a vacuum.

12. The non-porous glass body according to claim 7, wherein the dried preform is dried again in a chlorine or fluorine environment.

13. The non-porous glass body according to claim 7, wherein the fluorinating agent is fluorine-containing fluid.

14. The non-porous glass body according to claim 13, wherein the fluorinating agent selected from ammonium fluoride, ammonium bifluoride, HF or KF.

15. The non-porous glass body according to claim 7, wherein the rare earth ions fill the pores of the porous preform.

16. The non-porous glass body according to claim 7, wherein the fluorinating agent reacts with the rare earth ions within the pores to produce rare earth fluoride microcrystals.

17. An opto-electrical device comprising an article made of the non-porous glass body of claim 7.

18. An optical amplifier comprising an article made of the non-porous glass body of claim 7.

19. An optical fiber comprising the non-porous glass body of claim 7.

20. An opto-electrical device comprising a non-porous glass body having rare earth fluoride microcrystals doped within, and a composition on a weight percent basis consisting essentially of:

| | |
|---|---|
| $SiO_2$ | 0–99.0 |
| $GeO_2$ | 0–99.0 |
| $SiO_2 + GeO_2$ | 85–99.0 |
| $Al_2O_3 + Ga_2O_3$ | 0–14.9 |
| $RE_xF_y$ | 0.01–2.0 |
| $R_xF_y$ | 0.1–2.0 | wherein RE is a rare earth metal ion, R is an alkali or alkaline-earth ion, x and y are integers ≠0, further the glass contains 0 to 5 wt. % each, of at least one of the following oxides: $Y_2O_3$, $La_2O_3$, CdO, $B_2O_3$, SnO, $ZrO_2$, $P_2O_5$, $Sb_2O_5$, $As_2O_5$, or $Bi_2O_3$.

21. An optical amplifer comprising a non-porous glass body having rare earth fluoride microcrystals doped within, and a composition on a weight percent basis consisting essentially of:

| | |
|---|---|
| $SiO_2$ | 0–99.0 |
| $GeO_2$ | 0–99.0 |
| $SiO_2 + GeO_2$ | 85–99.0 |
| $Al_2O_3 + Ga_2O_3$ | 0–14.9 |
| $RE_xF_y$ | 0.01–2.0 |
| $R_xF_y$ | 0.1–2.0 | wherein RE is a rare earth metal ion, R is an alkali or alkaline-earth ion, x and y are integers ≠0, further the glass contains 0 to 5 wt. % each, of at least one of the following oxides: $Y_2O_3$, $La_2O_3$, CdO, $B_2O_3$, SnO, $ZrO_2$, $P_2O_5$, $Sb_2O_5$, $As_2O_5$, or $Bi_2O_3$.

22. An optical fiber comprising a non-porous glass body having rare earth fluoride microcrystals doped within, and a composition on a weight percent basis consisting essentially of:

| | |
|---|---|
| $SiO_2$ | 0–99.0 |
| $GeO_2$ | 0–99.0 |
| $SiO_2 + GeO_2$ | 85–99.0 |
| $Al_2O_3 + Ga_2O_3$ | 0–14.9 |
| $RE_xF_y$ | 0.01–2.0 |
| $R_xF_y$ | 0.1–2.0 | wherein RE is a rare earth metal ion, R is an alkali or alkaline-earth ion, x and y are integers ≠0, further the glass contains 0 to 5 wt. % each, of at least one of the following oxides: $Y_2O_3$, $La_2O_3$, CdO, $B_2O_3$, SnO, $ZrO_2$, $P_2O_5$, $Sb_2O_5$, $As_2O_5$, or $Bi_2O_3$.

23. The porous preform according to claim 22, wherein the porous preform is made by oxide vapor deposition.

24. The porous preform according to claim 22, wherein the porous preform has within it a multitude of pores, each pore having a size of about 500 nm or less.

25. The porous preform according to claim 24, wherein the porous preform has within it a multitude of pores, wherein each pore has a size in the range of about 200 nm to about 500 nm.

26. The porous preform according to claim 22, wherein the rare earth metal ions are selected from the group of Y, La, Ce, Pr, Nd, Pm, Sm, Eu, Gd, Tb, Dy, Ho, Er, Tm, Yb, or Lu.

27. The porous preform according to claim 24, wherein the rare earth metal is any one of Er, Pr, Eu, or Dy.

28. The porous preform according to claim 22, wherein the porous preform is consolidated into an optical amplifer.

29. The porous preform according to claim 22, wherein the porous preform is consolidated into an optical fiber.

30. A silica-based porous preform comprising rare earth fluoride microcrystals doped within, the porous preform having a composition on a weight percent basis consisting essentially of:

| | |
|---|---|
| $SiO_2$ | 0–99.0 |
| $GeO_2$ | 0–99.0 |
| $SiO_2 + GeO_2$ | 85–99.0 |
| $Al_2O_3 + Ga_2O_3$ | 0–14.9 |
| $RE_xF_y$ | 0.01–2.0 |
| $R_xF_y$ | 0.1–2.0 | wherein RE is a rare earth metal ion, R is an alkali or alkaline-earth ion, x and y are integers ≠0, further the glass contains 0 to 5 wt. % each, of at least one of the following oxides: $Y_2O_3$, $La_2O_3$, CdO, $B_2O_3$, SnO, $ZrO_2$, $P_2O_5$, $Sb_2O_5$, $As_2O_5$, or $Bi_2O_3$.

* * * * *